United States Patent
Warashina et al.

(10) Patent No.: US 11,032,749 B2
(45) Date of Patent: Jun. 8, 2021

(54) COMMUNICATION TERMINAL IN WIRELESS AD-HOC NETWORK, COMMUNICATION METHOD, AND COMMUNICATION PROGRAM

(71) Applicant: NEC Corporation, Tokyo (JP)

(72) Inventors: Yoshitomo Warashina, Tokyo (JP); Tomohiko Yagyu, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/483,076

(22) PCT Filed: Feb. 16, 2017

(86) PCT No.: PCT/JP2017/005707
§ 371 (c)(1),
(2) Date: Aug. 2, 2019

(87) PCT Pub. No.: WO2018/150514
PCT Pub. Date: Aug. 23, 2018

(65) Prior Publication Data
US 2019/0357096 A1 Nov. 21, 2019

(51) Int. Cl.
*H04W 4/00* (2018.01)
*H04W 36/00* (2009.01)
(Continued)

(52) U.S. Cl.
CPC ....... *H04W 36/0066* (2013.01); *H04W 36/08* (2013.01); *H04W 48/20* (2013.01); *H04W 52/383* (2013.01); *H04W 84/18* (2013.01)

(58) Field of Classification Search
CPC .......... A61F 2/4455; A61F 2002/30538; A61F 2002/30556; A61F 2002/30579;
(Continued)

(56) References Cited

U.S. PATENT DOCUMENTS

| | | | |
|---|---|---|---|
| 10,764,825 B2 * | 9/2020 | Tsuda | H04W 76/20 |
| 2004/0063451 A1 * | 4/2004 | Bonta | H04W 88/04 |
| | | | 455/519 |

(Continued)

FOREIGN PATENT DOCUMENTS

| | | |
|---|---|---|
| JP | 2001-136123 A | 5/2001 |
| JP | 2005-252781 A | 9/2005 |

(Continued)

OTHER PUBLICATIONS

International Search Report for PCT Application No. PCT/JP2017/005707, dated Apr. 4, 2017.

*Primary Examiner* — Chuong T Ho (57) ABSTRACT

A communication node includes: a control information sharing unit which distributes a relay node reselection request; a transmission power control unit which adjusts transmission power based on the relay node reselection request; a reselection necessity determination unit which determines whether another communication node is to become a new relay node, and, in the case of determining that the other communication node is to become the new relay node, calculating priority of the communication node in the wireless ad-hoc network; and a relay node reselection request unit which performs a relay node reselection request process for transmitting a relay node reselection request included in the control information, depending on the priority.

14 Claims, 6 Drawing Sheets

(51) Int. Cl.
*H04W 36/08* (2009.01)
*H04W 48/20* (2009.01)
*H04W 52/38* (2009.01)
*H04W 84/18* (2009.01)

(58) Field of Classification Search
CPC ...... A61F 2002/30904; A61F 2002/443; A61F 2002/30329; A61F 2002/30593; A61F 2/447
USPC ........................................................ 370/331
See application file for complete search history.

(56) References Cited

U.S. PATENT DOCUMENTS

| | | | |
|---|---|---|---|
| 2005/0197127 A1 | 9/2005 | Nakasaku et al. | |
| 2006/0045065 A1* | 3/2006 | Kim ................... | H04L 12/2854 370/351 |
| 2006/0199530 A1* | 9/2006 | Kawasaki ............. | H04W 40/08 455/7 |
| 2008/0274692 A1 | 11/2008 | Larsson | |
| 2010/0157845 A1* | 6/2010 | Womack ............... | H04W 76/14 370/254 |
| 2011/0194482 A1* | 8/2011 | Ji ......................... | H04W 48/08 370/315 |
| 2011/0231535 A1* | 9/2011 | Starnes .................. | H04W 4/70 709/223 |
| 2011/0249558 A1* | 10/2011 | Raaf ..................... | H04W 24/02 370/237 |
| 2012/0236704 A1* | 9/2012 | Tao ....................... | H04L 5/0023 370/203 |
| 2013/0235839 A1* | 9/2013 | Kim ...................... | H04L 5/0092 370/329 |
| 2013/0322287 A1* | 12/2013 | Bontu ................... | H04W 24/08 370/252 |
| 2013/0324130 A1* | 12/2013 | Maruta ................. | H04W 36/16 455/436 |
| 2015/0085738 A1* | 3/2015 | Kim ...................... | H04W 40/12 370/315 |
| 2017/0230484 A1* | 8/2017 | Lai ....................... | H04L 12/4625 |
| 2017/0303258 A1* | 10/2017 | Zhang .................. | H04W 72/048 |
| 2017/0347272 A1* | 11/2017 | Ahmavaara ........... | H04W 16/14 |
| 2018/0041889 A1 | 2/2018 | Chen | |
| 2018/0063768 A1* | 3/2018 | Martin .................. | H04W 36/30 |
| 2018/0092017 A1* | 3/2018 | Freda .................... | H04W 36/36 |
| 2018/0139640 A1* | 5/2018 | Chae .................... | H04W 72/1231 |
| 2018/0139682 A1* | 5/2018 | Xu ........................ | H04W 40/12 |
| 2018/0234919 A1* | 8/2018 | Tsuda ................... | H04W 52/0216 |
| 2018/0317268 A1* | 11/2018 | Kim ..................... | H04W 40/246 |
| 2018/0343598 A1* | 11/2018 | Xu ....................... | H04W 36/0055 |
| 2019/0037463 A1* | 1/2019 | Feng ..................... | H04W 76/14 |
| 2019/0159018 A1* | 5/2019 | Basu Mallick ....... | H04W 4/023 |
| 2019/0281526 A1* | 9/2019 | Freda ................... | H04B 7/15528 |
| 2019/0281644 A1* | 9/2019 | Hu ....................... | H04W 72/085 |
| 2019/0349722 A1* | 11/2019 | Lee ...................... | H04W 4/90 |
| 2020/0008075 A1* | 1/2020 | Ahmavaara ........... | H04W 16/14 |

FOREIGN PATENT DOCUMENTS

| | | |
|---|---|---|
| JP | 2008-306641 A | 12/2008 |
| JP | 2009-517918 A | 4/2009 |
| JP | 2012-054879 A | 3/2012 |
| JP | 2013-021738 A | 1/2013 |
| JP | 2015-109493 A | 6/2015 |
| WO | 2016/181547 A1 | 11/2016 |

\* cited by examiner

COMMUNICATION TERMINAL IN WIRELESS AD-HOC NETWORK, COMMUNICATION METHOD, AND COMMUNICATION PROGRAM

This application is a National Stage Entry of PCT/JP2017/005707 filed on Feb. 16, 2017, the contents of all of which are incorporated herein by reference, in their entirety.

TECHNICAL FIELD

The present invention relates to a communication node in a wireless ad-hoc network, a communication method, and a communication program for selecting an optimal relay node to prevent an increase of transmission power.

BACKGROUND ART

A wireless ad-hoc network is a network formed by a group of temporarily interconnected nodes using the relay function of each node. In the wireless ad-hoc network, a technique called "multihop communication" that connects many nodes to each other without involving a base station is used (for example, see Patent Literature (PTL) 1 and PTL 2). In the wireless ad-hoc network, nodes move constantly.

In a wireless ad-hoc network in which the frequency of movement of nodes is high, it is preferable to select an appropriate relay node based on indexes such as communication load, node throughput, and remaining battery level, in order to maintain communication among all nodes.

The optimized link state routing protocol (OLSR) is one of the protocols used in wireless ad-hoc networks. In the case of using OLSR, a multipoint relay (MPR) set, which is a set of relay nodes, is used to reduce redundant messages in flooding. In Long Term Evolution-Device to Device (LTE-D2D), a relay node is selected using a discovery signal (discovery message) for discovering a surrounding node. A cluster head in a sensor network collects sensor information from surrounding sensor nodes, and transmits the collected sensor information to a sink node. A node with the shortest distance with the sink node and all nodes is selected as a cluster head, or a cluster head is selected based on communication cost, remaining battery level, and the like.

For example, PTL 3 describes a technique whereby all nodes adjust power when transmitting each packet based on various objectives in a wireless ad-hoc network. For example, PTL 4 describes transmission power control for a wireless node, although not related to a wireless ad-hoc network.

Objectives of adjusting transmission power include communication quality improvement, interference suppression, interception avoidance, and battery consumption reduction. Regarding communication quality improvement, for example, in a network that allows for multihop communication, transmission power is increased when it is necessary to communicate, with low delay, important packets that need to be treated in real time. As a result of increasing transmission power, the communication range widens, and consequently the number of hops and the packet loss rate decrease. On the other hand, reducing transmission power to narrow the communication range achieves interference suppression, interception avoidance, and battery consumption reduction. In the case of selecting a relay node based on the distances with other nodes, each node adjusts transmission power so that a signal reaches the relay node.

PTL 1 describes a technique whereby, in a wireless ad-hoc network, a node selects a communication path based on received electric field strength. With this technique, however, each node transmits control information with uniform transmission power. Besides, regarding transmission power control, each node merely controls transmission power depending on received electric field strength.

PTL 4 describes a technique of preventing a node that is not to be selected as a relay node from being selected as a relay node. With this technique, however, a base station selects a relay node. The technique is therefore not applicable to wireless ad-hoc networks.

CITATION LIST

Patent Literatures

PTL 1: Japanese Patent Application Laid-Open No. 2005-252781
PTL 2: Japanese Translation of PCT International Application Publication No. 2009-517918
PTL 3: Japanese Patent Application Laid-Open No. 2012-54879
PTL 4: Japanese Patent Application Laid-Open No. 2001-136123

SUMMARY OF INVENTION

Technical Problem

In relay node selection and transmission power control, for example, a node acquires necessary information reactively or proactively in order to select an appropriate relay node or calculate transmission power.

However, in the case where a node is in a state in which transmission power is reduced to such a level that is necessary for a signal to reach a relay node, if the network environment changes as a result of movement of nodes, accurate information may not be able to be acquired. For example, there is a possibility that a relay node cannot be reselected even when a previously selected relay node is no longer optimal, or transmission power of a node becomes inappropriate. Increasing transmission power in order to acquire accurate information causes a decrease in effects such as interference suppression and interception avoidance.

The present invention has an object of, even when the frequency of movement of nodes in a wireless ad-hoc network is high, enabling a node to constantly select an optimal relay node while performing appropriate transmission power control.

Solution to Problem

A communication node according to the present invention is a communication node in a wireless ad-hoc network in which a plurality of communication nodes are present, the communication node including: control information sharing means for notifying control information including at least the number of neighboring nodes as information to each of the neighboring nodes, and acquiring, from each of the neighboring nodes, control information of the neighboring node; relay node selection means for selecting, as a relay node, a communication node capable of directly communicating with all communication nodes in the wireless ad-hoc network, based on the control information; transmission power control means for adjusting transmission power depending on a selection result of the relay node selection means; reselection necessity determination means for determining whether another communication node is to become a new relay node, and, in the case of determining that the other communication node is to become the new relay node, calculating priority of the communication node in the wireless ad-hoc network; and relay node reselection request means for performing a relay node reselection request process for transmitting a relay node reselection request included in the control information, depending on the priority, wherein the control information sharing means distributes the relay node reselection request, and wherein the transmission power control means adjusts the transmission power based on the relay node reselection request.

A communication method according to the present invention is a communication method in a wireless ad-hoc network in which a plurality of communication nodes are present, the communication method including: notifying control information including at least the number of neighboring nodes as information to each of the neighboring nodes, and acquiring, from each of the neighboring nodes, control information of the neighboring node; selecting, as a relay node, a communication node capable of directly communicating with all communication nodes in the wireless ad-hoc network, based on the control information; adjusting transmission power depending on a selection result in the selecting; determining whether another communication node is to become a new relay node, and, in the case of determining that the other communication node is to become the new relay node, calculating priority of a communication node in the wireless ad-hoc network; and performing a process for transmitting a relay node reselection request included in the control information, depending on the priority, wherein the relay node reselection request is distributed when notifying the control information to each of the neighboring nodes, and wherein the transmission power is adjusted based on the relay node reselection request.

A communication program according to the present invention is a communication program implemented in a communication device in a wireless ad-hoc network in which a plurality of communication nodes are present, the communication program causing a computer to execute: a control information sharing process of notifying control information including at least the number of neighboring nodes as information to each of the neighboring nodes, and acquiring, from each of the neighboring nodes, control information of the neighboring node; a relay node selection process of selecting, as a relay node, a communication node capable of directly communicating with all communication nodes in the wireless ad-hoc network, based on the control information; a transmission power control process of adjusting transmission power depending on a selection result in the relay node selection process; a reselection necessity determination process of determining whether another communication node is to become a new relay node, and, in the case of determining that the other communication node is to become the new relay node, calculating priority of the communication node in the wireless ad-hoc network; and a relay node reselection request process for transmitting a relay node reselection request included in the control information, depending on the priority, wherein the computer is caused to execute, in the control information sharing process, a process of distributing the relay node reselection request, and wherein the computer is caused to execute, in the transmission power control process, a process of adjusting the transmission power based on the relay node reselection request.

Advantageous Effects of Invention

According to the present invention, a communication node can constantly select an optimal relay node while performing appropriate transmission power control in a wireless ad-hoc network.

DESCRIPTION OF EMBODIMENT

An exemplary embodiment of the present invention will be described below, with reference to the drawings. Although a wireless ad-hoc network of narrow band in which the frequency of movement of nodes is high is assumed in this exemplary embodiment, the present invention is also applicable to wireless ad-hoc networks not meeting such conditions. The wireless ad-hoc network (hereafter also simply referred to as "network") assumed in this exemplary embodiment has such a size that, when maximum transmission power is set in each node, at least one node can directly communicate with (i.e. neighboring) all other nodes.

Figure 1:
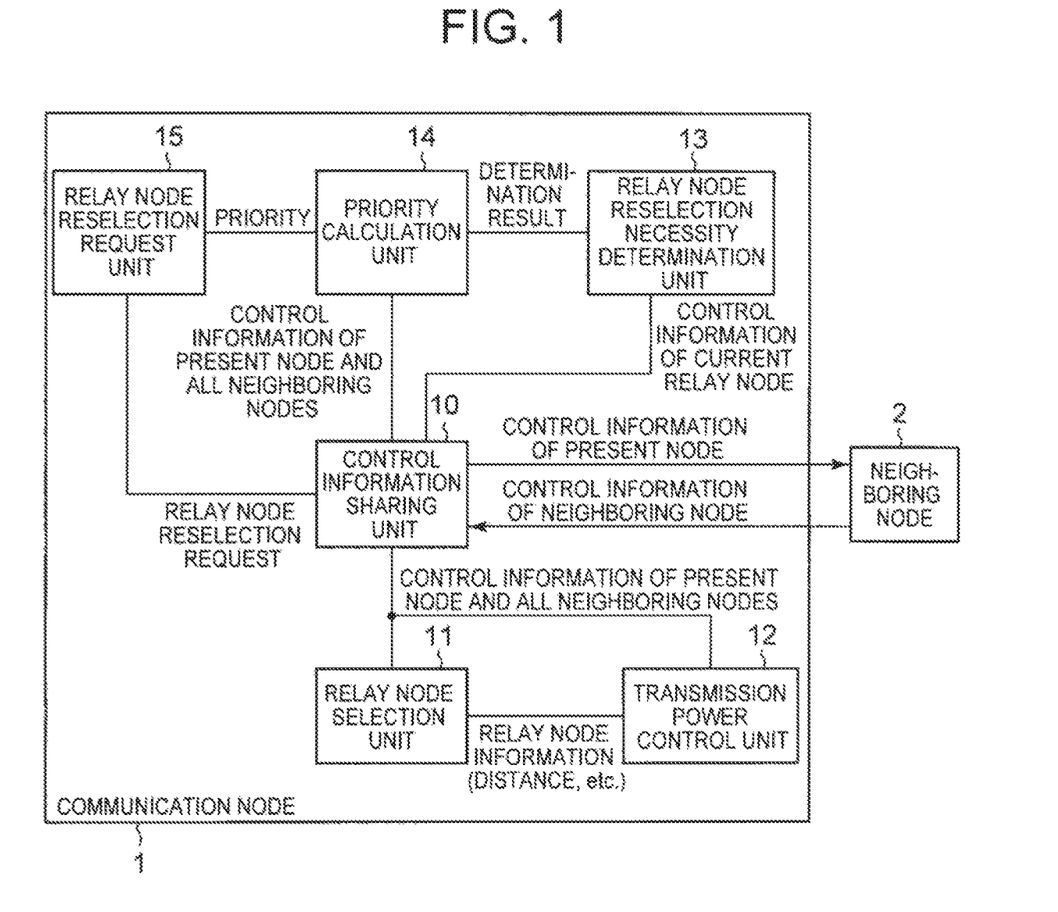
FIG. 1 is a block diagram depicting an example of the structure of a communication node.

FIG. 1 is a block diagram depicting an example of the structure of a communication node in a wireless ad-hoc network. The communication node is, for example, a smartphone, a tablet node, or a personal computer. As depicted in FIG. 1, a communication node 1 includes a control information sharing unit 10, a relay node selection unit 11, a transmission power control unit 12, a relay node reselection necessity determination unit 13, a priority calculation unit 14, and a relay node reselection request unit 15. Although FIG. 1 depicts one neighboring node 2, a plurality of neighboring nodes can exist in the wireless ad-hoc network. Blocks for controlling primary communication (e.g. data communication) in the communication node 1 are omitted in FIG. 1.

The communication node 1 can be implemented by software. In detail, the control information sharing unit 10, the relay node selection unit 11, the transmission power control unit 12, the relay node reselection necessity determination unit 13, the priority calculation unit 14, and the relay node reselection request unit 15 are implemented by an information processor including a central processing unit (CPU) that executes processes according to a program stored in a storage device such as a read only memory (ROM) or a hard disk. The control information sharing unit 10, the relay node selection unit 11, the transmission power control unit 12, the relay node reselection necessity determination unit 13, the priority calculation unit 14, and the relay node reselection request unit 15 can also be implemented by individual hardware.

The control information sharing unit 10 shares control information of a fixed length with the neighboring node 2, and supplies the control information of its own node (the communication node 1) and the control information of the neighboring node 2 to the relay node selection unit 11, the transmission power control unit 12, the relay node reselection necessity determination unit 13, and the priority calculation unit 14.

The relay node selection unit 11 selects a communication node as a relay node from among the own node (the present node) and at least one neighboring node 2, based on the number n of neighboring nodes and information d indicating an average estimated distance between the present node and the neighboring node 2 included in the control information (the control information of the present node and the control information of the neighboring node 2) received from the control information sharing unit 10. The relay node selection unit 11 then notifies the transmission power control unit 12 whether the present node is the relay node. The information d indicates, for example, a value $((\Sigma_n d_n)/n$, where $d_n$ denotes an estimated distance between the present node and the nth neighboring node 2) corresponding to the average distance between the present node and n neighboring nodes. For example, the distance with the neighboring node 2 can be estimated from a path loss value based on reception power of a signal from the neighboring node 2.

The transmission power control unit 12, at initial startup, either sets the transmission power to a fixed value (e.g. maximum value) or controls the transmission power to increase in stages until all nodes can receive a signal. It is assumed in the following description that the transmission power is set to the maximum value at initial startup. The maximum value is a power value with which direct communication with all other nodes is possible, as mentioned above.

The transmission power control unit 12 controls the transmission power after the relay node is selected, based on a transmission power value P of the neighboring node 2 included in the control information of the neighboring node 2 received from the control information sharing unit 10 (the control information received from the neighboring node 2) and the control information of the relay node received from the relay node selection unit 11. For example, in the case where the present node is selected as the relay node, the transmission power control unit 12 controls the transmission power so that a signal from the present node reaches the most distant communication node. In the case where a communication node other than the present node is selected as the relay node, the transmission power control unit 12 controls the transmission power so that a signal from the present node reaches the communication node selected as the relay node.

In the case where the control information received from the control information sharing unit 10 includes a relay node reselection request, the transmission power control unit 12 controls the transmission power so that a signal from the own node reaches a communication node that is the transmission source of the control information.

The relay node reselection necessity determination unit 13 determines whether the current relay node is appropriate, based on the number n of neighboring nodes and the information d. In the case where the current relay node is not appropriate, the relay node reselection necessity determination unit 13 starts the priority calculation unit 14.

The priority calculation unit 14 calculates priority for becoming the next relay node candidate based on (n, d) of each of its own node (present node) and the neighboring node 2 that can be acquired from the control information sharing unit 10, and supplies the priority to the relay node reselection request unit 15. The relay node reselection request unit 15 outputs a relay node reselection request to the control information sharing unit 10, based on the priority received from the priority calculation unit 14. Herein, (n, d) denotes the information n and the information d in the control information.

Figure 2:
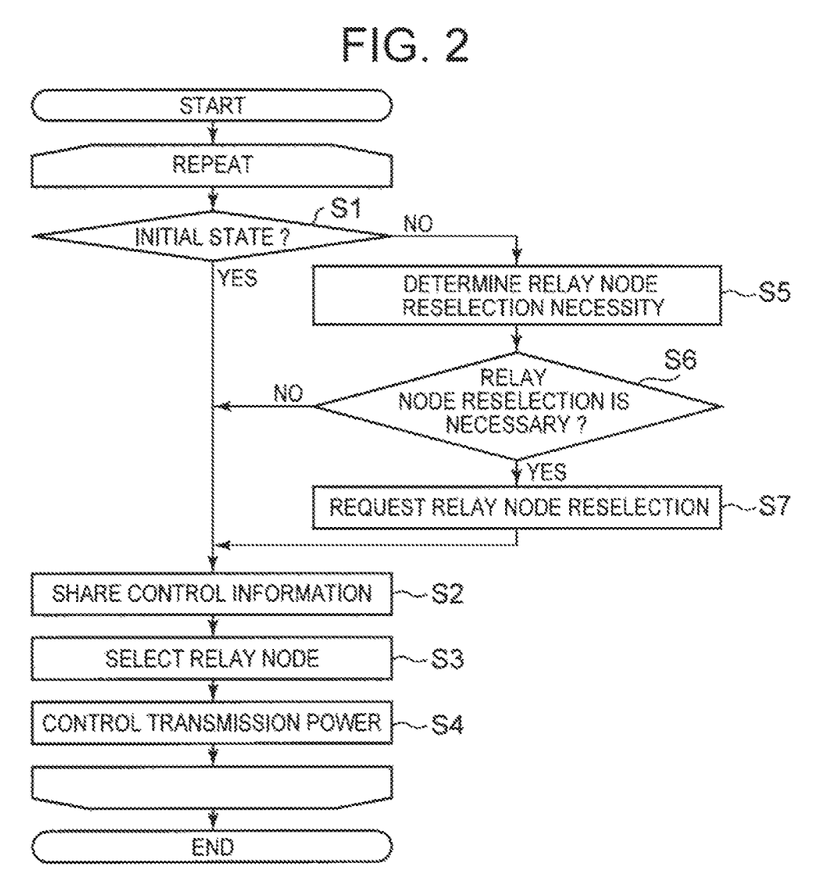
FIG. 2 is a flowchart depicting basic operation of the communication node.

Operation of the communication node 1 will be described below. FIG. 2 is a flowchart depicting basic operation of the communication node 1.

In the case where the communication node 1 is in an initial state, i.e. in the case where the communication node 1 does not hold control information of other communication nodes, the communication node 1 sets the value of transmission power of the communication node to a fixed value sufficient for a signal to reach the end of the network. As illustrated in FIG. 2, the control information sharing unit 10 and the relay node selection unit 11 first perform a control information sharing process and a relay node selection process to select an initial relay node (steps S1, S2, and S3). The transmission power control unit 12 performs a transmission power control process (step S4).

Subsequently, i.e. when not at initial startup, the relay node reselection necessity determination unit 13 determines whether the current relay node is appropriate (step S5). That is, the relay node reselection necessity determination unit 13 determines whether relay node reselection is necessary. In the case where the relay node reselection necessity determination unit 13 determines that relay node reselection is necessary (step S6), a relay node reselection request process is performed (step S7). In the case where the relay node reselection necessity determination unit 13 determines that relay node reselection is not necessary, the process in step S7 is not performed.

In the relay node reselection request process, the priority calculation unit 14 performs a relay node reselection procedure depending on priority, in response to a request from the relay node reselection request unit 15. After this, the processes in step S2 to S4 are performed.

The communication node 1 repeatedly performs the processes in steps S1 to S7.

Figure 3:
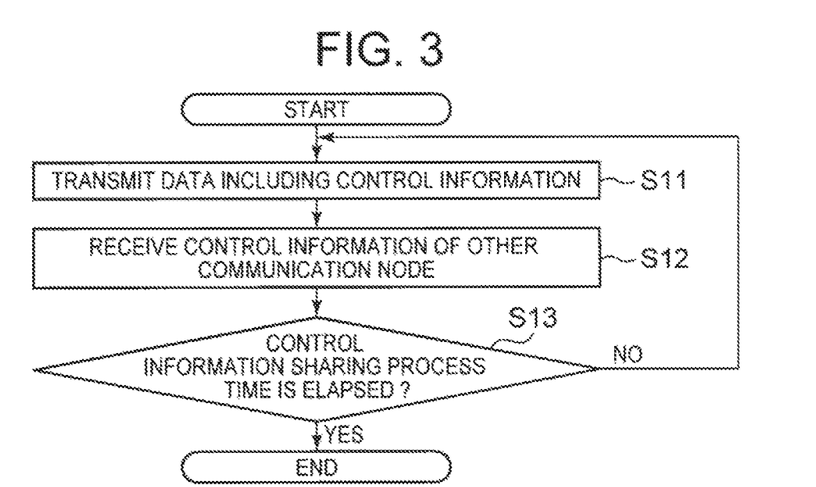
FIG. 3 is a flowchart depicting an example of a control information sharing process.

FIG. 3 is a flowchart depicting an example of the control information sharing process in step S2. In the control information sharing process, the control information sharing unit 10 in the communication node 1 repeatedly performs the processes in steps S11 to S12 (step S13). Specifically, the control information sharing unit 10 performs the processes in steps S11 to S12 each time a time period preset as a control information sharing process time has elapsed.

In step S11, in the case where a relay node reselection request has not been received from any other communication node and the relay node reselection request has not been received from the relay node reselection necessity determination unit 13, the control information sharing unit 10 transmits data including control information (P, n, d) to the other communication node. P is the value of transmission power of its own node (the present node), and n and d are respectively the number of neighboring nodes recognized in the present node and information indicating the average distance between the present node and the at least one neighboring node 2. The control information (P, n, d)

denotes the information P, the information n, and the information d in control information.

The control information sharing unit 10 monitors reception of control information from surrounding other communication nodes (step S12). In the case where control information is received from an neighboring node, the control information sharing unit 10 updates the information n and the information d in the control information of the present node.

Figure 4:
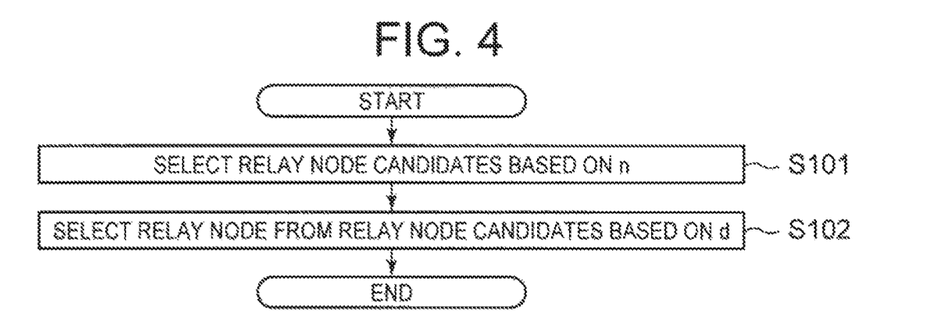
FIG. 4 is a flowchart depicting an example of a relay node selection process.

FIG. 4 is a flowchart depicting an example of the relay node selection process in step S3. In the relay node selection process, the relay node selection unit 11 in the communication node 1 selects each communication node whose n indicating the number of neighboring nodes is N−1 (N is the number of all nodes) (communication nodes recognizing n=N−1), as a relay node candidate (S101). The relay node selection unit 11 selects a communication node whose d indicating the distance information with neighboring nodes is the smallest value of the selected relay node candidates, as a relay node (S102).

As a result of the processes in steps S101 and S102, a communication node that is neighboring to the most other communication nodes and has the smallest average distance with the neighboring other communication nodes is selected. In this exemplary embodiment, it is presumed that, when maximum transmission power is set in each node, at least one node can directly communicate with all other nodes. Hence, the number of communication nodes whose n is N−1 is one or more.

Figure 5:
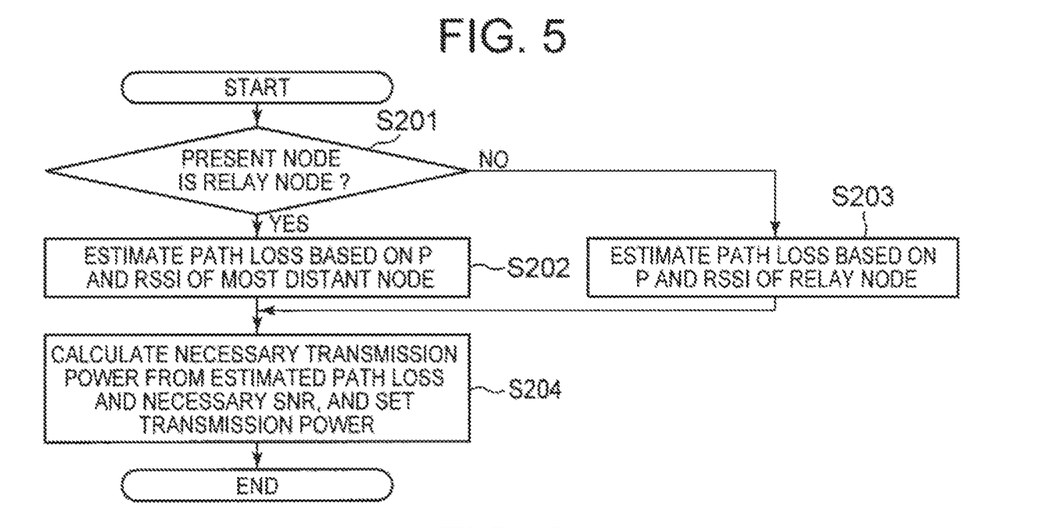
FIG. 5 is a flowchart depicting an example of a transmission power control process.

FIG. 5 is a flowchart depicting an example of the transmission power control process in step S4. In the transmission power control process, in the case where its own node (the present node) is the relay node (step S201), the transmission power control unit 12 in the communication node 1 calculates a path loss value based on the transmission power value P and the received signal strength indicator (RSSI) of the most distant communication node (step S202). That is, the transmission power control unit 12 estimates the path loss value. In the case where the present node is not the relay node (step S201), the transmission power control unit 12 estimates the path loss value based on the transmission power value P and the RSSI of the relay node (S203).

Following this, the transmission power control unit 12 calculates transmission power necessary for communication with the target, based on the estimated path loss value and a signal to noise ratio (SNR) or a bit error rate (BER) required to decode a message (step S204). The calculation result of step S204 is set as the transmission power of the communication node 1. The target corresponds to the most distant communication node from the present node in the case where the process in step S202 is performed, and the relay node in the case where the process in step S203 is performed.

Since there is a possibility that the reception environment of the communication node as the transmission source is poor, when calculating the transmission power, the transmission power control unit 12 may use information such as the SNR, BER, or average noise power value of the communication node as the transmission source according to need, in addition to (P, n, d). That is, the transmission power control unit 12 may calculate the transmission power necessary for communication, in consideration of the SNR or the BER. The transmission power control unit 12 may calculate transmission power including a margin of a certain value, instead of taking the SNR or the BER into consideration.

Figure 6:
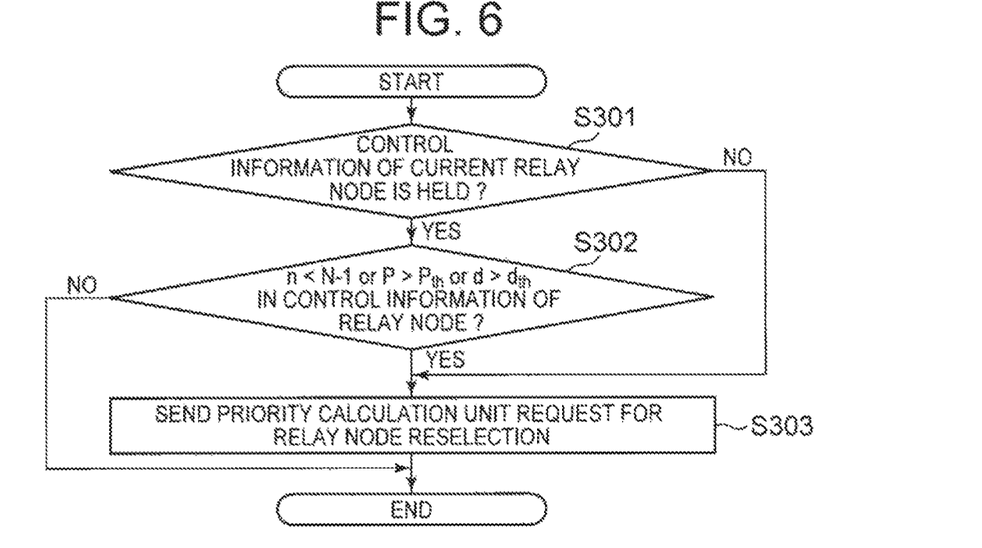
FIG. 6 is a flowchart depicting an example of a relay node reselection necessity determination process.

FIG. 6 is a flowchart depicting an example of the relay node reselection necessity determination process in step S5. The relay node reselection necessity determination unit 13 in the communication node 1 determines whether the current relay node is an appropriate relay node.

In the relay node reselection necessity determination process, the relay node reselection necessity determination unit 13 first determines whether the control information sharing unit 10 holds the control information of the current relay node (step S301). In the case where the control information is held, the relay node reselection necessity determination unit 13 determines whether the control information held in the control information sharing unit 10 still satisfies a condition for being a relay node (step S302). The condition for being a relay node is, for example, that the number n of neighboring nodes of the relay node is N−1 (N is the number of all nodes), that the transmission power value P of the relay node is less than a threshold $P_{th}$ set by a user, that the average estimated distance d between the relay node and its neighboring nodes is less than a threshold $d_{th}$, etc.

In the case where the held control information does not satisfy the condition for being a relay node, the process in step S303 is performed. In the case where at least one of the number n of neighboring nodes of the relay node being N−1 (N is the number of all nodes), the transmission power value P of the relay node being greater than or equal to the threshold $P_{th}$ set by the user, and the average estimated distance d between the relay node and its neighboring nodes being greater than or equal to the threshold $d_{th}$ applies, the relay node reselection necessity determination unit 13 determines that the condition for being a relay node is no longer satisfied. Even when the number n of neighboring nodes of the relay node N−1, if there is any other communication node X whose number n of neighboring nodes is N−1, the relay node reselection necessity determination unit 13 may determine that the condition for being a relay node is no longer satisfied in the case where the difference ($d_x$−d) between the average estimated distance $d_x$ between the communication node X and its neighboring nodes and the average estimated distance d between the relay node and its neighboring nodes is greater than or equal to a predetermined threshold.

In the case where the control information is not held because, for example, the communication node is in the initial state or the current relay node is out of range, relay node reselection is essential, and accordingly the operation advances to step S303.

In step S303, the relay node reselection necessity determination unit 13 notifies the priority calculation unit 14 that relay node reselection is necessary.

Figure 7:
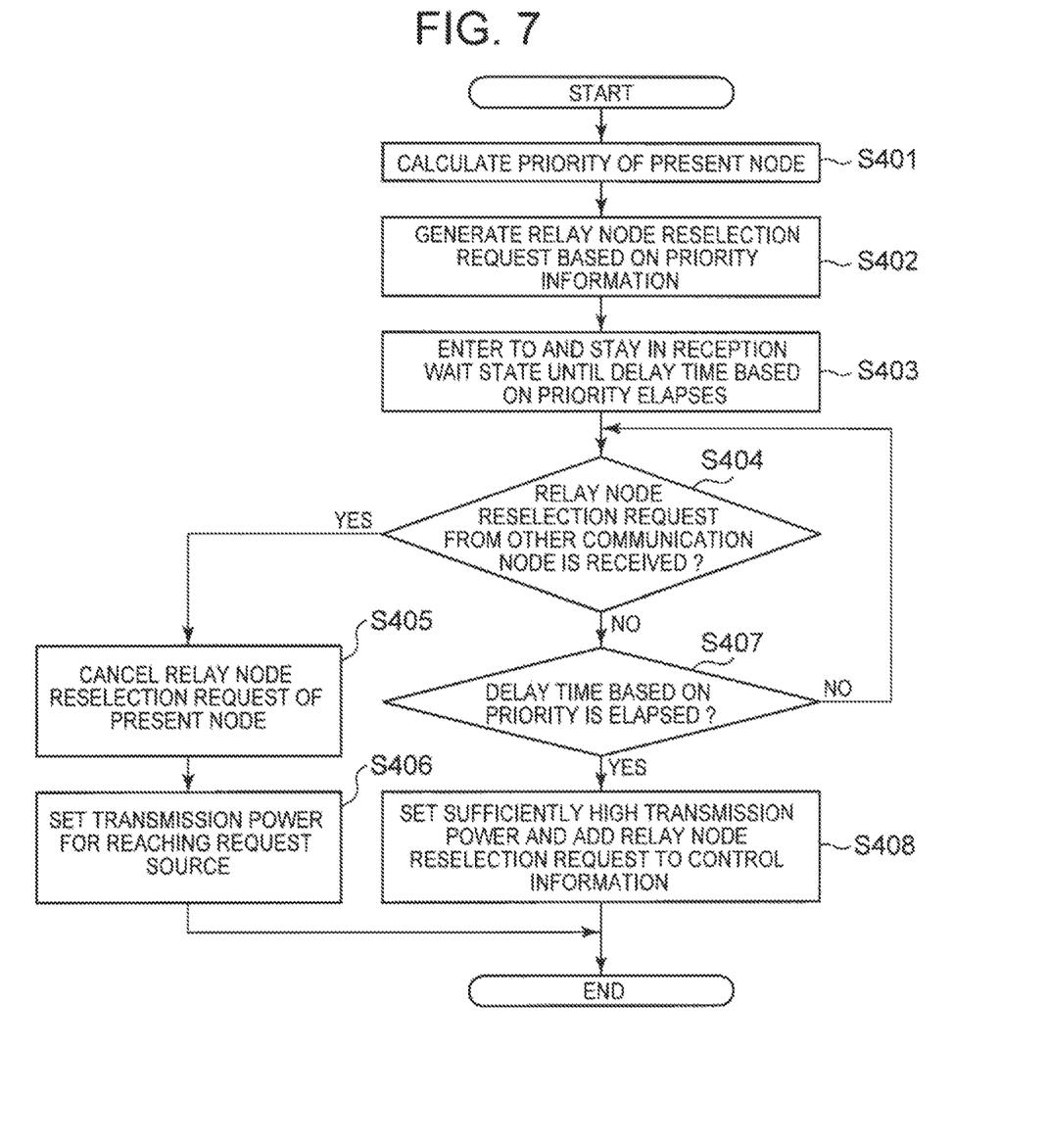
FIG. 7 is a flowchart depicting an example of a relay node reselection request process.

FIG. 7 is a flowchart depicting an example of the relay node reselection request process in step S7. Each communication node in the network is denoted by $c_x$ (x=0, 1, ..., N−1), and a set of neighboring nodes of the communication node $c_x$ is denoted by $C(x)=\{c_o, c_1, ...\}$. That is, the number n of neighboring nodes is $|C(x)|$.

The priority calculation unit 14 in the communication node $c_x$, upon being notified of a relay node reselection request from the relay node reselection necessity determination unit 13, first notifies the relay node reselection request unit 15 of a total value $n_{sum}(x)$ of t the number of neighboring nodes of the communication node $c_x$ and the number of neighboring nodes of the communication nodes neighboring to the communication node $c_x$, as priority (step S401). $n_{sum}(x)$ is expressed by the following Formula (1).

[Math. 1]

$$n_{sum}(x)=|C(x)|+\Sigma_j|C(j)|(j:c_j \in C(x)) \quad (1)$$

$n_{sum}(x)$ indicates how many communication nodes are present within 2 hops of the communication node $c_x$. $n_{sum}(x)$ serves as a simple index indicating whether the communication node $c_x$ is close to the center position in the network. A communication node with greater $n_{sum}(x)$ is more likely to become a relay node preferentially. Any communication node not holding the control information of the current relay node is, however, not suitable as a relay node candidate. For such a communication node, $n_{sum}(x)$ is set to 0 to assign the lowest priority.

Next, the relay node reselection request unit 15 generates a relay node reselection request based on $n_{sum}(x)$ (S402). Specifically, in the case where the priority exceeds a predetermined value (e.g. in the case where the priority is not 0), the relay node reselection request unit 15 generates the relay node reselection request. The control information sharing unit 10 then transitions to a reception wait state (step S403). The reception wait state continues until a delay time calculated based on the priority elapses (step S407).

In the case where, in the reception wait state, the control information sharing unit 10 receives a relay node reselection request from another communication node (step S404), the relay node reselection request unit 15 determines that there is a communication node higher in priority than the present node, and cancels the relay node reselection request (step S405). The relay node reselection request unit 15 then requests the transmission power control unit 12 to set the transmission power so that a signal reaches the communication node as the transmission source of the relay node reselection request (step S406). The transmission power control unit 12 sets the transmission power in response to the request.

In the case where the above-described delay time has elapsed before receiving a relay node reselection request from another communication node in the reception wait state (step S407), the relay node reselection request unit 15 requests the transmission power control unit 12 to set transmission power sufficient for a signal to reach a distant communication node (e.g. the most distant communication node) (step S408). The transmission power control unit 12 sets the transmission power in response to the request. The relay node reselection request unit 15 also notifies the control information sharing unit 10 of the relay node reselection request generated in the process in step S402 (step S408). The control information sharing unit 10 adds the relay node reselection request to the control information of the present node, and transmits the control information to which the relay node reselection request has been added to the other communication node (see step SS11 in FIG. 3).

Information included in the relay node selection request generated based on the priority includes, for example, "delay time" until distributing the relay node reselection request and "transmission power value" when distributing the relay node reselection request.

The delay time is indicated by a time T obtained by adding a time T1 inversely proportional to $n_{sum}(x)$ (including inversely proportional to the square of $n_{sum}(x)$, inversely proportional to the logarithm of $n_{sum}(x)$, inversely proportional to the exponent of $n_{sum}(x)$, etc.) and a time T2 proportional to the information d (including proportional to the square of the information d, proportional to the logarithm of the information d, proportional to the exponent of the information d, etc.). Here, T2 based on d is added in order to, given that there is a possibility of a plurality of communication nodes with the same $n_{sum}(x)$ being present, differentiate these communication nodes from each other. The time scale of T2 may be sufficiently shorter than the time scale of T1. For example, T1 may be in seconds, and T2 in milliseconds.

Thus, it is possible to determine approximate priority by $n_{sum}(x)$, and more finely prioritize communication nodes similar in priority by d. By setting the delay time T as described above, a communication node higher in priority can distribute a relay node reselection request earlier. A communication node lower in priority receives a relay node reselection request of a communication node higher in priority, before distributing its relay node reselection request. The communication node lower in priority can thus cancel distribution of its relay node reselection request.

The delay time determined as described above is used in the process in step S407.

The transmission power value is indicated by a transmission power value P obtained by adding a transmission power value P1 proportional to $n_{sum}(x)$ (including proportional to the square of $n_{sum}(x)$, proportional to the logarithm of $n_{sum}(x)$, proportional to the exponent of $n_{sum}(x)$, etc.) and a transmission power value P2 inversely proportional to the information d (including inversely proportional to the square of the information d, inversely proportional to the logarithm of the information d, inversely proportional to the exponent of the information d, etc.). Here, P2 based on d is added in order to, given that there is a possibility of a plurality of communication nodes with the same $n_{sum}(x)$ being present, differentiate these communication nodes from each other, as with T2. The transmission power value of P2 may be sufficiently smaller than the transmission power value of P1. For example, P1 may be in 10 dBm, and P2 in 1 dBm.

By setting the transmission power value P as described above, a communication node higher in priority can distribute a relay node reselection request farther. Then, by causing a communication node that has received the relay node reselection request to respond with transmission power reaching the present node (the communication node that has transmitted the relay node reselection request), the number n of neighboring nodes of the communication node that has transmitted the relay node reselection request is more likely to be N−1 in the control information sharing process which follows (see step S2 in FIG. 2).

The transmission power value determined as described above is used in the process in step S408.

In the case where the information included in the relay node reselection request is the transmission power value, the operation of the communication node 1 from step S403 in the relay node reselection request process in FIG. 7 changes.

First, the relay node reselection request unit 15 requests the transmission power control unit 12 to set the value of transmission power to the foregoing transmission power value P. Until a fixed time common to all communication nodes elapses, the relay node reselection request unit 15 allows the control information sharing unit 10 to transmit/receive a relay node reselection request. The relay node reselection request unit 15 requests the transmission power control unit 12 to set the transmission power so that a signal reaches a communication node as the source of the request with the highest transmission power. Subsequently, the process in step S2 illustrated in FIG. 2 is performed.

Figure 8:
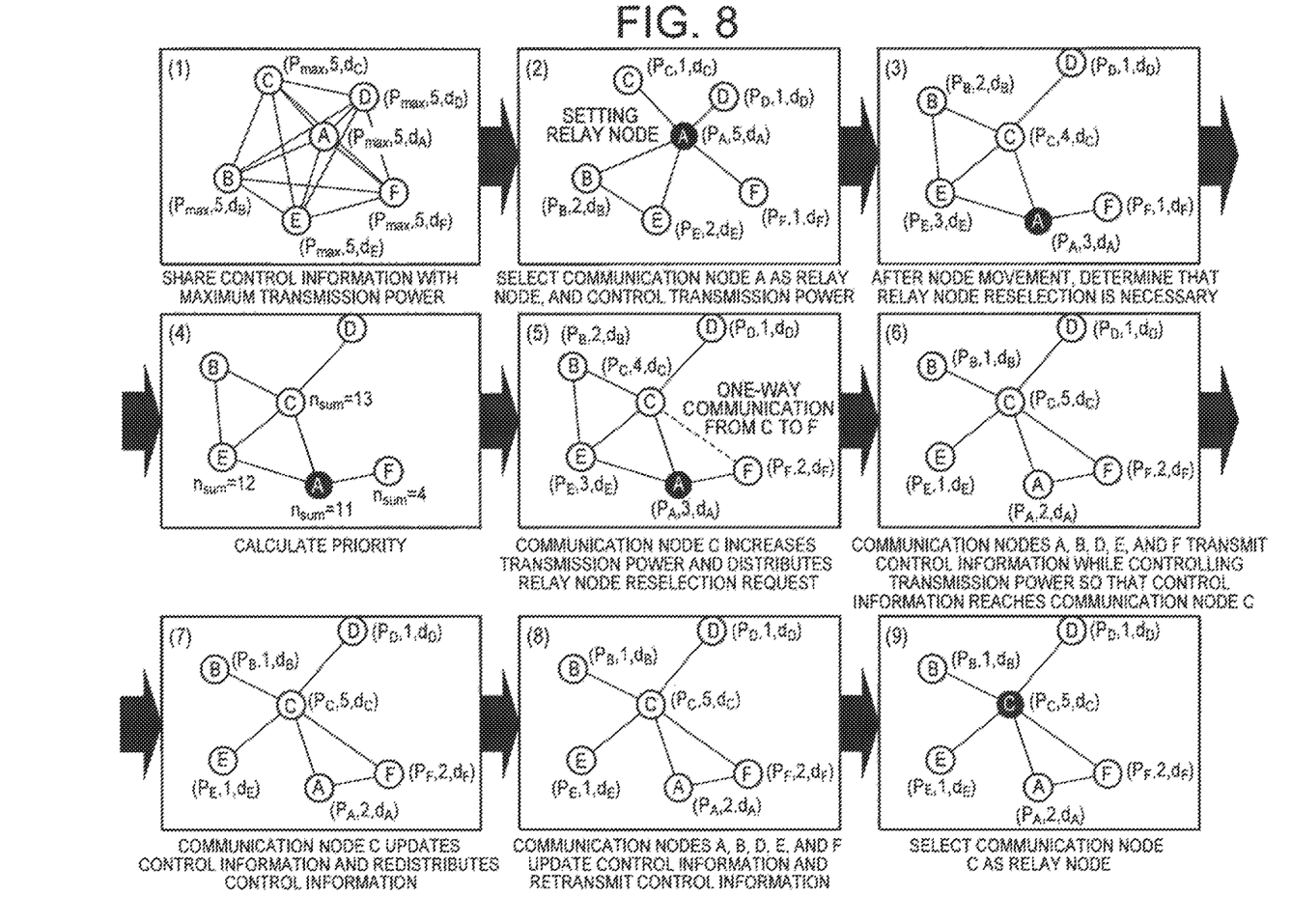
FIG. 8 is an explanatory diagram depicting a specific operation example of each communication node in a wireless ad-hoc network.

A specific operation example of communication nodes in a wireless ad-hoc network will be described below, with reference to an explanatory diagram in FIG. 8. In FIG. 8, the state of the communication nodes distributed in the wireless ad-hoc network changes in the time direction designated by the arrows. Six communication nodes A, B, C, D, E, and F are illustrated in FIG. 8. In the first state, the communication node A is closest to the center in the network.

(P, n, d) in the control information of each communication node is indicated in the parentheses near the circle mark representing its own node (the present node). As mentioned above, P indicates the transmission power value, n indicates the number of neighboring nodes, and d indicates the average estimated distance between the present node and its neighboring nodes.

In the first state (1), all communication nodes distribute their control information with the maximum transmission power (see step S11 in FIG. 3). Next, each communication node updates the control information of its own node based on the number of signals (corresponding to the number n of neighboring nodes) and the control information that can be received from the other communication nodes. After this, each communication node distributes its control information again (see steps S13 and S11 in FIG. 3).

In state (2), each communication node compares n and d of its own node with n and d of its neighboring nodes. Each communication node selects a relay node based on the comparison result. In the example in FIG. 8, in state (1), n of all communication nodes is 5 (N−1), and all communication nodes are qualified to be a relay node. Accordingly, all communication nodes select the communication node A whose control information includes the smallest value of d, as the relay node (see FIG. 4). The communication node A controls the transmission power so as to reach the most distant communication node B (see steps S201, S202, and S204 in FIG. 5). The other communication nodes control the transmission power so as to reach the communication node A that has become the relay node (see steps S201, S203, and S204 in FIG. 5).

In state (3), the communication node A moves too far away from the communication nodes B and D and as a result can no longer communicate with the communication nodes B and D. Since n of the communication node A is 3 and thus the communication node A is no longer appropriate as a relay node, each communication node determines that relay node reselection is necessary (see steps S302 and S303 in FIG. 6).

The communication nodes B and D may each determine that the own node is not suitable as a relay node at the point when it cannot be communicate with the relay node (communication node A) even though the transmission power reaches the upper limit, and not perform the processes in states (4) and (5).

In state (4), the communication node A and the communication nodes C, E, and F holding the control information of the communication node A which is the current relay node each calculate the total value $n_{sum}$ (priority) of n of its own node and n of its neighboring nodes.

In state (5), $n_{sum}$ of the communication node C is largest. That is, the priority of the communication node C is highest. Hence, the communication node C first distributes the control information including a relay node selection request with sufficiently high transmission power (for example, a fixed value (e.g. maximum value)) (see step S408 in FIG. 7). Here, each communication node calculates a delay time until distributing a relay node reselection request, based on $n_{sum}$ (see step S407 in FIG. 7). The transmission power control unit 12 in the communication node C may increase the transmission power in stages until all nodes can receive the signal, instead of setting the transmission power to the fixed value such as the maximum value.

In state (6), the communication nodes A, B, D, E, and F that have received the relay node reselection request from the communication node C each transmit the control information with transmission power that can reach the communication node C (see steps S404, S405, and S406 in FIG. 7).

In state (7), after distributing the relay node reselection request, the communication node C updates the control information of its own node based on the control information received from the other communication nodes, and redistributes the control information of the own node (see step S2 in FIG. 2 and steps S11 and S12 in FIG. 3).

In state (8), the communication nodes A, B, D, E, and F each update (P, n, d) included in the control information, and redistributes the control information (see step S2 in FIG. 2 and step S11 in FIG. 3).

In state (9), all communication nodes, each having acquired the latest control information of the other communication nodes, select a relay node (see step S3 in FIG. 2). In the example in FIG. 8, in state (9), n is 5 only in the communication node C. All communication nodes accordingly recognize the communication node C as the relay node to replace the communication node A (see steps S101 and S102 in FIG. 4), and perform corresponding transmission power control (see step S4 in FIG. 2 and FIG. 5).

In the case where there is a communication node whose n is 5 as well as the communication node C and whose d is smaller, all communication nodes recognize this communication node as the relay node, and perform transmission power control (see steps S101 and S102 in FIG. 4).

The operation of each communication node in states (1) and (2) is performed only at initial startup, and subsequently the operation in states (3) to (9) is repeatedly performed.

In this exemplary embodiment, the relay node is selected by distributing the information (n, d) corresponding to the number n of neighboring nodes and the average estimated distance d between the present node and its neighboring nodes to the surrounding nodes and also receiving, from the surrounding nodes, the information (n, d) of the surrounding nodes, and comparing the received information (n, d) of the other communication nodes (surrounding nodes) and the information (n, d) of the present node. Specifically, from among communication nodes having control information in which n is N−1 (N is the number of all nodes), a communication node whose d is smallest is selected as the relay node. Subsequently, when n of the relay node becomes less than N−1 or is likely to become N−1, each communication node calculates its priority based on the collected information (n, d), and starts the relay node reselection procedure based on the priority.

Each communication node shares the information P corresponding to the transmission power of each transmission source (each communication node), together with the information (n, d) of all communication nodes in the network. Each communication node controls the transmission power depending on its role (whether it is the relay node or not) based on the information P. The relay node adjusts the transmission power so that a signal reaches a communication node most distant from the relay node. The other communication nodes adjust the transmission power so that a signal reaches the relay node.

In this exemplary embodiment, even in a dynamic operation situation, all communication nodes can communicate with each other within 2 hops, because the relay node performs transmission power control so that a signal reaches the most distant communication node. Moreover, interference power to the other communication nodes in the wireless ad-hoc network can be suppressed and also susceptibility to detection can be reduced, because the communication nodes other than the relay node limit the transmission power to such a level that is just sufficient for a signal to reach the relay node.

In this exemplary embodiment, each communication node can select a communication node close to the center of the network as a relay node, without exchanging control signals including detailed positional information and communication node-specific information.

(P, n, d) is distributed on a regular basis. Alternatively, (P, n, d) is added to any data and transmitted. To be compatible with the narrow band, P may be expressed not as an absolute value such as x[mW], y[dBm] but as, for example, power level information of 10 levels set beforehand in the system. n may be information of only the number of neighboring nodes, without including the identification information of the neighboring nodes. d may be not an absolute value but degenerated information (e.g. information expressed in a predetermined number of levels), as with P. The use of such a simpler expression method reduces the information amount of (P, n, d).

Figure 9:
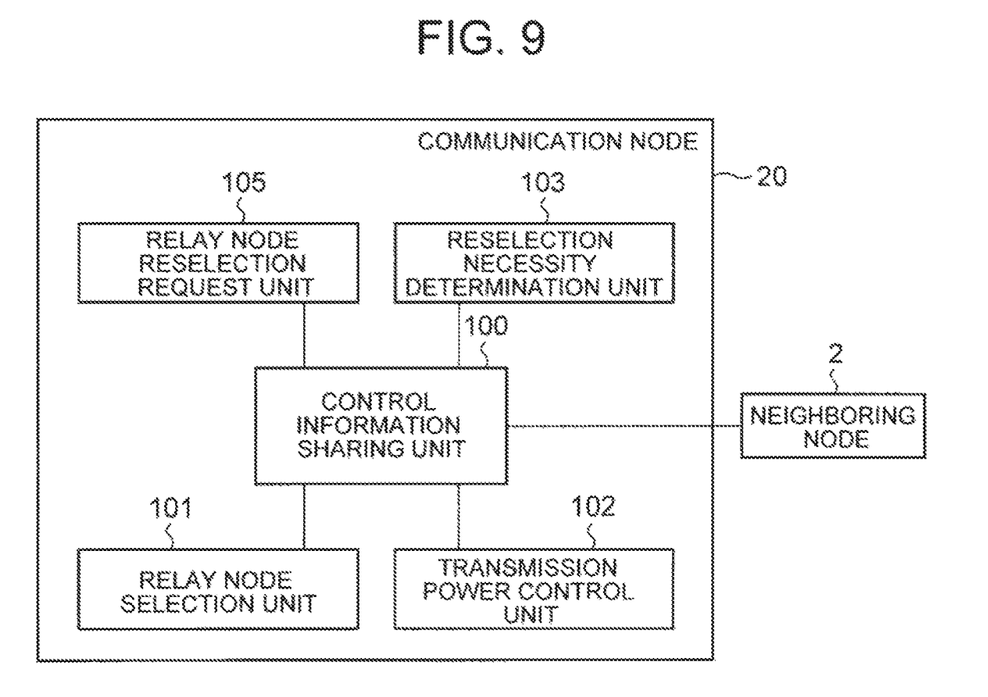
FIG. 9 is a block diagram depicting main parts of a communication node in a wireless ad-hoc network.

FIG. 9 is a block diagram depicting main parts of a communication node in a wireless ad-hoc network. As depicted in FIG. 9, a communication node 20 includes: a control information sharing unit 100 (implemented by the control information sharing unit 10 in the exemplary embodiment) for notifying control information including at least the number of neighboring nodes as information to each neighboring node 2, and acquiring, from the neighboring node 2, control information of the neighboring node 2; a relay node selection unit 101 (implemented by the relay node selection unit 11 in the exemplary embodiment) for selecting, as a relay node, a communication node capable of directly communicating with all communication nodes in the wireless ad-hoc network, based on the control information; a transmission power control unit 102 (implemented by the transmission power control unit 12 in the exemplary embodiment) for adjusting transmission power depending on a selection result of the relay node selection unit 101; a reselection necessity determination unit 103 (implemented by the relay node reselection necessity determination unit 13 and the priority calculation unit 14 in the exemplary embodiment) for determining whether another communication node is to become a new relay node, and, in the case of determining that the other communication node is to become the new relay node, calculating priority of the communication node in the wireless ad-hoc network; and a relay node reselection request unit 105 (implemented by the relay node reselection request unit 15 in the exemplary embodiment) for performing a relay node reselection request process for transmitting a relay node reselection request included in the control information, depending on the priority, wherein the control information sharing unit 100 distributes the relay node reselection request, and wherein the transmission power control unit 102 adjusts the transmission power based on the relay node reselection request.

The foregoing exemplary embodiment can be wholly or partially described as the following supplementary notes, but the structures of the present invention are not limited to the following structures.

(Supplementary note 1) A communication node in a wireless ad-hoc network in which a plurality of communication nodes are present, the communication node including: control information sharing means for notifying control information including at least the number of neighboring nodes as information to each of the neighboring nodes, and acquiring, from each of the neighboring nodes, control information of the neighboring node; relay node selection means for selecting, as a relay node, a communication node capable of directly communicating with all communication nodes in the wireless ad-hoc network, based on the control information; transmission power control means for adjusting transmission power depending on a selection result of the relay node selection means; reselection necessity determination means for determining whether another communication node is to become a new relay node, and, in the case of determining that the other communication node is to become the new relay node, calculating priority of the communication node in the wireless ad-hoc network; and relay node reselection request means for performing a relay node reselection request process for transmitting a relay node reselection request included in the control information, depending on the priority, wherein the control information sharing means distributes the relay node reselection request, and wherein the transmission power control means adjusts the transmission power based on the relay node reselection request.

(Supplementary note 2) The communication node according to supplementary note 1, wherein the control information includes information corresponding to a transmission power value of its own node, information corresponding to the number of neighboring nodes to the communication node, and information corresponding to an average value of estimated distances between the own node and the neighboring nodes.

(Supplementary note 3) The communication node according to supplementary note 1 or 2, wherein the relay node selection means selects, as the relay node, a communication node having a smallest average value of estimated distances between its own node and neighboring nodes from among communication nodes that recognize the number of neighboring nodes to be (the number of all communication nodes−1).

(Supplementary note 4) The communication node according to any one of supplementary notes 1 to 3, wherein the reselection necessity determination means determines to set the other communication node as the new relay node, when the number of neighboring nodes of the communication node that is currently the relay node is less than (the number of all nodes−1).

(Supplementary note 5) The communication node according to any one of supplementary notes 1 to 3, wherein the reselection necessity determination means determines to set the other communication node as the new relay node, when transmission power of the relay node is greater than or equal to a predetermined threshold.

(Supplementary note 6) The communication node according to any one of supplementary notes 1 to 3, wherein the reselection necessity determination means determines to set the other communication node as the new relay node, when an average value of estimated distances between the relay node and neighboring nodes is greater than or equal to a predetermined threshold.

(Supplementary note 7) The communication node according to any one of supplementary notes 1 to 3, wherein in the case where a communication node having the number of neighboring nodes of (the number of all communication nodes−1) is present, the reselection necessity determination means determines to set the present communication node as the new relay node when an average value of estimated distances between the relay node and the neighboring nodes is less than an average value of estimated distances between the relay node and neighboring nodes by a predetermined threshold or more.

(Supplementary note 8) The communication node according to any one of supplementary notes 1 to 7, wherein the transmission power control means sets the transmission power to a fixed value or increases the transmission power in stages until all communication nodes are able to receive a signal, in an initial state where control information of another communication node is not held or when distributing the relay node reselection request.

(Supplementary note 9) The communication node according to any one of supplementary notes 1 to 8, wherein when the relay node reselection request is received from another communication node, the transmission power control means adjusts the transmission power so that a signal reaches the communication node that is a transmission source of the relay node reselection request.

(Supplementary note 10) The communication node according to any one of supplementary notes 1 to 9, wherein the reselection necessity determination means sets a total value of the number of neighboring nodes of its own node and the number of communication nodes neighboring to the neighboring nodes of the own node, as the priority.

(Supplementary note 11) The communication node according to any one of supplementary notes 1 to 10, wherein the relay node reselection request means determines a transmission timing of the relay node reselection request depending on the priority of its own node.

(Supplementary note 12) The communication node according to any one of supplementary notes 1 to 11, wherein the relay node reselection request means determines a transmission power value when transmitting the relay node reselection request, to be a value proportional to the priority of its own node.

(Supplementary note 13) A communication method in a wireless ad-hoc network in which a plurality of communication nodes are present, the communication method including: notifying control information including at least the number of neighboring nodes as information to each of the neighboring nodes, and acquiring, from each of the neighboring nodes, control information of the neighboring node; selecting, as a relay node, a communication node capable of directly communicating with all communication nodes in the wireless ad-hoc network, based on the control information; adjusting transmission power depending on a selection result in the selecting; determining whether another communication node is to become a new relay node, and, in the case of determining that the other communication node is to become the new relay node, calculating priority of a communication node in the wireless ad-hoc network; and performing a process for transmitting a relay node reselection request included in the control information, depending on the priority, wherein the relay node reselection request is distributed when notifying the control information to each of the neighboring nodes, and wherein the transmission power is adjusted based on the relay node reselection request.

(Supplementary note 14) The communication method according to supplementary note 13, wherein the control information includes information corresponding to a transmission power value of its own node, information corresponding to the number of neighboring nodes of the communication node, and information corresponding to an average value of estimated distances between the own node and the neighboring nodes.

(Supplementary note 15) The communication method according to supplementary note 13 or 14, wherein, as the relay node, a communication node having a smallest average value of estimated distances between its own node and neighboring nodes is selected from among communication nodes that recognize the number of neighboring nodes to be (the number of all communication nodes−1).

(Supplementary note 16) The communication method according to any one of supplementary notes 13 to 15, wherein it is determined to set the other communication node as the new relay node, when the number of neighboring nodes of the communication node that is currently the relay node is less than (the number of all nodes−1).

(Supplementary note 17) The communication method according to any one of supplementary notes 13 to 15, wherein it is determined to set the other communication node as the new relay node, when transmission power of the relay node is greater than or equal to a predetermined threshold.

(Supplementary note 18) The communication method according to any one of supplementary notes 13 to 15, wherein it is determined to set the other communication node as the new relay node, when an average value of estimated distances between the relay node and neighboring nodes is greater than or equal to a predetermined threshold.

(Supplementary note 19) The communication method according to any one of supplementary notes 13 to 15, wherein in the case where a communication node having the number of neighboring nodes of (the number of all communication nodes−1) is present, it is determined to set the present communication node as the new relay node when an average value of estimated distances between the present communication node and the neighboring nodes is less than an average value of estimated distances between the relay node and neighboring nodes by a predetermined threshold or more.

(Supplementary note 20) The communication method according to any one of supplementary notes 13 to 19, wherein the transmission power is set to a fixed value or increased in stages until all communication nodes are able to receive a signal, in an initial state in which control information of another communication node is not held or when distributing the relay node reselection request.

(Supplementary note 21) The communication method according to any one of supplementary notes 13 to 20, wherein when the relay node reselection request is received from another communication node, the transmission power is adjusted so that a signal reaches the communication node that is a transmission source of the relay node reselection request.

(Supplementary note 22) The communication method according to any one of supplementary notes 13 to 21, wherein a total value of the number of neighboring nodes of the present node and the number of communication nodes neighboring to the neighboring nodes to the present node is set as the priority.

(Supplementary note 23) The communication method according to any one of supplementary notes 13 to 22, wherein a transmission timing of the relay node reselection request is determined depending on the priority of the present node.

(Supplementary note 24) The communication method according to any one of supplementary notes 13 to 23, wherein a transmission power value when transmitting the relay node reselection request is determined to be a value proportional to the priority of the communication node.

(Supplementary note 25) A communication program implemented in a communication device in a wireless ad-hoc network in which a plurality of communication nodes are present, the communication program causing a computer to execute: a control information sharing process of notifying control information including at least the number of neighboring nodes as information to each of the neighboring nodes, and acquiring, from each of the neighboring nodes, control information of the neighboring node; a relay node selection process of selecting, as a relay node, a communication node capable of directly communicating with all communication nodes in the wireless ad-hoc network, based on the control information; a transmission power control process of adjusting transmission power depending on a selection result in the relay node selection process; a reselection necessity determination process of determining whether another communication node is to become a new relay node, and, in the case of determining that the other communication node is to become the new relay node, calculating priority of the communication node in the wireless ad-hoc network; and a relay node reselection request process for transmitting a relay node reselection request included in the control information, depending on the priority, wherein the computer is caused to execute, in the control information sharing process, a process of distributing the relay node reselection request, and wherein the computer is caused to execute, in the transmission power control process, a process of adjusting the transmission power based on the relay node reselection request.

(Supplementary note 26) A non-transitory recording medium having recorded therein a communication program implemented in a communication device in a wireless ad-hoc network in which a plurality of communication nodes are present, the computer program, when executed by a processor, causing a computer to execute: notifying control information including at least the number of neighboring nodes as information to each of the neighboring nodes, and acquiring, from each of the neighboring nodes, control information of the neighboring node; selecting, as a relay node, a communication node capable of directly communicating with all communication nodes in the wireless ad-hoc network, based on the control information; adjusting transmission power depending on a selection result in the selecting; determining whether another communication node is to become a new relay node, and, in the case of determining that the other communication node is to become the new relay node, calculating priority of a communication node in the wireless ad-hoc network; and performing a process for transmitting a relay node reselection request included in the control information, depending on the priority, wherein the relay node reselection request is distributed when notifying the control information to each of the neighboring nodes, and wherein the transmission power is adjusted based on the relay node reselection request.

(Supplementary note 27) A communication program for executing the communication method according to any one of supplementary notes 13 to 24.

REFERENCE SIGNS LIST 1 communication node
2 neighboring node
10 control information sharing unit
11 relay node selection unit
12 transmission power control unit
13 relay node reselection necessity determination unit
14 priority calculation unit
15 relay node reselection request unit
20 communication node
100 control information sharing unit
101 relay node selection unit
102 transmission power control unit
103 reselection necessity determination unit
105 relay node reselection request unit

What is claimed is:

1. A communication node in a wireless ad-hoc network in which a plurality of communication nodes are present, the communication node comprising:
   a control information sharing circuit which notifies control information including at least the number of neighboring nodes as information to each of the neighboring nodes, and acquiring, from each of the neighboring nodes, control information of the neighboring node;
   a relay node selection circuit which selects, as a relay node, a communication node capable of directly communicating with all communication nodes in the wireless ad-hoc network, based on the control information;
   a transmission power control circuit which adjusts transmission power depending on a selection result of the relay node selection circuit;
   a reselection necessity determination circuit which determines whether another communication node is to become a new relay node, and, in the case of determining that the other communication node is to become the new relay node, calculating priority of the communication node in the wireless ad-hoc network; and
   a relay node reselection request circuit which performs a relay node reselection request process for transmitting a relay node reselection request included in the control information, depending on the priority,
   wherein the control information sharing circuit distributes the relay node reselection request, and
   wherein the transmission power control circuit adjusts the transmission power based on the relay node reselection request.

2. The communication node according to claim 1, wherein the control information includes information corresponding to a transmission power value of its own communication node, information corresponding to the number of neighboring nodes, and information corresponding to an average value of estimated distances between the own node and the neighboring nodes.

3. The communication node according to claim 1, wherein the relay node selection circuit selects, as the relay node, a communication node having a smallest average value of estimated distances between its own node and neighboring nodes from among communication nodes that recognize the number of neighboring nodes to be the number of all communication nodes—1.

4. The communication node according to claim 1, wherein the reselection necessity determination circuit determines to set the other communication node as the new relay node, when the number of neighboring nodes of the communication node that is currently the relay node is less than the number of all communication nodes—1.

5. The communication node according to claim 1, wherein the reselection necessity determination circuit determines to set the other communication node as the new relay node, when transmission power of the relay node is greater than or equal to a predetermined threshold.

6. The communication node according to claim 1, wherein the reselection necessity determination circuit determines to set the other communication node as the new relay node, when an average value of estimated distances between the relay node and neighboring nodes is greater than or equal to a predetermined threshold.

7. The communication node according to claim 1, wherein in the case where a communication node having the number of neighboring nodes of the number of all communication nodes—1 is present, the reselection necessity determination circuit determines to set the present communication node as the new relay node when an average value of estimated distances between the relay node and the neighboring nodes is less than an average value of estimated distances between the relay node and neighboring nodes by a predetermined threshold or more.

8. The communication node according to claim 1, wherein the transmission power control circuit sets the transmission power to a fixed value or increases the transmission power in stages until all communication nodes are able to receive a signal, in an initial state where control information of another communication node is not held or when distributing the relay node reselection request.

9. The communication node according to claim 1, wherein when the relay node reselection request is received from another communication node, the transmission power control circuit adjusts the transmission power so that a signal reaches the communication node that is a transmission source of the relay node reselection request.

10. The communication node according to claim 1, wherein the reselection necessity determination circuit sets a total value of the number of neighboring nodes of its own node and the number of communication nodes neighboring to the neighboring nodes of the own node, as the priority.

11. The communication node according to claim 1, wherein the relay node reselection request circuit determines a transmission timing of the relay node reselection request depending on the priority of the communication node.

12. The communication node according to claim 1, wherein the relay node reselection request circuit determines a transmission power value when transmitting the relay node reselection request, to be a value proportional to the priority of the communication node.

13. A communication method in a wireless ad-hoc network in which a plurality of communication nodes are present, the communication method comprising:
notifying control information including at least the number of neighboring nodes as information to each of the neighboring nodes, and acquiring, from each of the neighboring nodes, control information of the neighboring node;
selecting, as a relay node, a communication node capable of directly communicating with all communication nodes in the wireless ad-hoc network, based on the control information;
adjusting transmission power depending on a selection result in the selecting;
determining whether another communication node is to become a new relay node, and, in the case of determining that the other communication node is to become the new relay node, calculating priority of a communication node in the wireless ad-hoc network; and
performing a process for transmitting a relay node reselection request included in the control information, depending on the priority,
wherein the relay node reselection request is distributed when notifying the control information to each of the neighboring nodes, and
wherein the transmission power is adjusted based on the relay node reselection request.

14. A non-transitory computer readable information recording medium storing a communication program implemented in a communication device in a wireless ad-hoc network in which a plurality of communication nodes are present that, when executed by a processor, performs a method for:
notifying control information including at least the number of neighboring nodes as information to each of the neighboring nodes, and acquiring, from each of the neighboring nodes, control information of the neighboring node;
selecting, as a relay node, a communication node capable of directly communicating with all communication nodes in the wireless ad-hoc network, based on the control information;
adjusting transmission power depending on a selection result in the relay node selection process;
determining whether another communication node is to become a new relay node, and, in the case of determining that the other communication node is to become the new relay node, calculating priority of the communication node in the wireless ad-hoc network; and
transmitting a relay node reselection request included in the control information, depending on the priority,
wherein the relay node reselection request is distributed when notifying the control information to each of the neighboring nodes, and
wherein the transmission power is adjusted based on the relay node reselection request.

* * * * *